United States Patent
Sridhar et al.

(10) Patent No.: US 7,958,250 B2
(45) Date of Patent: Jun. 7, 2011

(54) SYSTEM AND METHOD FOR MULTI-LEVEL GUIDED NODE AND TOPOLOGY DISCOVERY

(75) Inventors: Suresh Sridhar, Irving, TX (US); Shamika Naik, Irving, TX (US); Thurman O. Pylant, Priddy, TX (US); Michael Rieser, Allen, TX (US); Steven Darrel Woodcock, Highland Village, TX (US); S. Dale Ander, Dallas, TX (US); Palanisamy Grounder, Irving, TX (US); Guy Briggs, Coppell, TX (US); Ashish Rajput, Euless, TX (US); John Lyon, Marshfield, MA (US)

(73) Assignee: Sterling Commerce, Inc., Dublin, OH (US)

( * ) Notice: Subject to any disclaimer, the term of this patent is extended or adjusted under 35 U.S.C. 154(b) by 1380 days.

(21) Appl. No.: 10/984,538

(22) Filed: Nov. 9, 2004

(65) Prior Publication Data

US 2006/0101340 A1    May 11, 2006

(51) Int. Cl.
*G06F 15/16* (2006.01)

(52) U.S. Cl. ......................................... 709/230; 709/238
(58) Field of Classification Search ................... 709/230, 709/238
See application file for complete search history.

(56) References Cited

U.S. PATENT DOCUMENTS

| | | | |
|---|---|---|---|
| 6,269,330 B1 * | 7/2001 | Cidon et al. | 714/43 |
| 6,781,989 B1 * | 8/2004 | Acharya | 370/392 |
| 7,318,105 B1 * | 1/2008 | Bongiovanni et al. | 709/238 |
| 2002/0091857 A1 * | 7/2002 | Conrad et al. | 709/238 |
| 2002/0159451 A1 * | 10/2002 | Foster et al. | 370/389 |
| 2003/0033427 A1 * | 2/2003 | Brahmaroutu | 709/238 |
| 2003/0041167 A1 * | 2/2003 | French et al. | 709/238 |
| 2003/0061339 A1 | 3/2003 | Benfield et al. | |
| 2004/0153568 A1 * | 8/2004 | Ho et al. | 709/238 |
| 2004/0196865 A1 | 10/2004 | Natarajan et al. | |
| 2004/0249976 A1 * | 12/2004 | Neustadter et al. | 709/245 |
| 2005/0125518 A1 | 6/2005 | Knees et al. | |

* cited by examiner

*Primary Examiner* — William C Vaughn, Jr.
*Assistant Examiner* — Boris Gorney
(74) *Attorney, Agent, or Firm* — Toler Law Group (57) ABSTRACT

Systems and methods for user-guided iterative node discovery and topology discovery in a network of nodes involved in secure and reliable data transfer.

9 Claims, 12 Drawing Sheets

SYSTEM AND METHOD FOR MULTI-LEVEL GUIDED NODE AND TOPOLOGY DISCOVERY

DESCRIPTION OF RELATED ART

The present invention relates to Connect:Direct server, a commercially available product used for advanced file transfer, from Sterling Commerce, Dallas, Tex., an SBC business.

FIELD OF THE INVENTION

The present invention relates to data transfer over a network, and particularly to systems and methods for the multi-level, guided, discovery of nodes for secure, reliable, data transfer between nodes, and for mapping the topology of nodes in a network.

BACKGROUND OF THE INVENTION

Secure, reliable and automated transfer of mission-critical data has become the backbone of successful modern enterprises. This activity is an integral part of business processes that not only span business units within an organization but also extend outside the organization to customers, vendors/suppliers, financial institutions, business partners, governmental and regulatory agencies and other constituencies. The transferred data can be structured or non-structured and can reside in files that may be as small as an individual insurance claim or multi-gigabyte files such as complex CAD-CAM drawings, consolidated financial data or database backups to disaster recovery sites.

The financial services industry, for example, provides a wide variety of business processes such as securities clearing and settlement, funds transfer (ACH), credit card processing, and cash management. Such services require secure, reliable and automated data transfer. Similar business processes that involve secure data transfer can be found in other industries as well. Examples include billing (telecom), inventory updates (retail) and claims processing (insurance). Many business controls, such as service level agreements, regulatory requirements and associated penalties and organizational production schedules, require that secure data transfer be an integral part of the enterprise-wide IT strategy and infrastructure.

Large networks are inherently unreliable and are prone to breakdown because of their size and complexity. The resulting disruptions in data transfer—for example, due to network interruptions or server failures—can have a negative impact on the business. The strategic importance of the data transfer activity for business operations, therefore, requires that such activities are dependable, manageable and secure. As the number of data transfer activities increases, the need for automation becomes a critical element in the cost-effective and reliable operation of a data movement infrastructure.

BRIEF DESCRIPTION OF THE DRAWINGS

The present invention is further described in the detailed description that follows, by reference to the noted drawings, by way of non-limiting examples of embodiments of the present invention, in which like reference numerals represent similar parts throughout several views of the drawings, and in which:

FIG. 2 is a sample graphical user interface (GUI) of the present invention, specifically an Explorer List GUI.

FIG. 3 is a sample GUI of the present invention, specifically a Discovered List GUI.

DETAILED DESCRIPTION OF THE INVENTION

In view of the foregoing, the present invention, through one or more of its various aspects, embodiments and/or specific features or sub-components, is thus intended to bring out one or more of the advantages that will be evident from the description. The present invention is described with frequent reference to Connect:Direct server, a commercially available product. It is understood, however, that Connect:Direct is merely an example of a specific embodiment of the present invention, which is directed generically network node discovery, within the scope of the invention. The terminology, examples, drawings and embodiments, therefore, are not intended to limit the scope of the invention.

A "node" is a packaged, special-purpose software application that facilitates the secure, reliable and automated transfer of mission-critical data. For example, Connect:Direct server, a product from Sterling Commerce, used for advanced file transfer may be considered as a node. An enterprise may have several nodes distributed in different locations under different domains and connected via a computer network. Two nodes are considered "peer nodes" if they have substantially equivalent capabilities and may run on identical or different operating systems/platforms. For example, two Connect:Direct servers running on Unix and Windows platforms, respectively, can be considered as "peer nodes".

A node typically communicates with one or more peer nodes using the computer network. An example of peer-to-peer communication is high-volume, high-speed, secure file transfer between two Connect:Direct servers. Each node must be independently and manually configured to explicitly specify the peer nodes with which it can communicate and the specific protocols that can be used for each peer-to-peer communication. Thus, it is possible to have multiple peer nodes on the same network with only a subset of them communicating with each other. Alternatively, it is possible to have peer nodes in completely different network domains (i.e., not a part of the same subnetwork) and yet communicate with each other. The corresponding topology of connections is referred to herein as "logical" topology. This is in contrast to "physical" topology that characterizes the physical connectivity relationships that exist among nodes in a computer network.

Node "A" can communicate with another peer node "B" only if it has information about node B (such as node B's IP address and port number) and the communication protocol (such as TCP/IP or SNA). Such information may be specified as part of node A's configuration (also known as "Network Map" entries) or provided as command-line parameters for a file transfer process defined at node A. For convenience, "Network Map" is referred to as "netmap" in the rest of this disclosure.

A file transfer process is defined whereby node A is required to transfer the file to node B. Node A checks for the existence of information about node B (as a netmap entry or as a command-line parameter). If this information is available at node A, then file transfer from node A to node B is initiated and the status of the file transfer (initiation, progress and termination) is recorded at both nodes. For example, for Connect:Direct server, the information about the file transfer that is recorded at both nodes is known as "statistics record". Several statistics records are created depending on the file transfer process. If node A does not have the required information about node B, then the file transfer from node A to node B cannot occur.

Two major problems faced by enterprises with several distributed peer nodes include node discovery and topology discovery.

Node Discovery

Enterprises with several nodes distributed throughout the enterprise need to track and account for the nodes for several reasons such as license compliance, security controls and efficient resource utilization (such as determining a busy or idle state). The greater the number of nodes and the more widespread they are distributed, the greater is the challenge for node discovery.

Nodes may be "lost" due to moves and upgrades to computer infrastructure. For example, changes in IP address or port numbers may make it difficult to discover the existence of a node. Staffing changes (re-organization, employee turnover, or reduction in force) may also lead to improper accounting of the nodes. Also, it is possible that some nodes that were initially deployed for testing/evaluation may continue to exist or may be in use long after the test/evaluation is over. This can expose the enterprise to license-related legal liability issues.

Topology Discovery

A node communicates with one another only if information about its peer nodes are specified as part of its configuration (netmap entry or command-line parameter). It is possible, therefore, to discover the existence of peer nodes from a given node. Such information is useful to discover the topology (that is, what nodes can communicate with which other nodes).

Nodes may also be "lost" due to moves and upgrades to computer infrastructure. For example, changes in IP address or port numbers may limit a node's ability to communicate with its peer nodes, which leads to inconsistencies between discovered topology (based on netmap entries) and the actual reality.

Furthermore, some of the configuration information (netmap entry or command-line parameter) may be inaccurate (i.e., invalid information) or rendered obsolete (i.e., valid information but not in use for a long time). The challenge is to discover the "logical" topology of the nodes rather than the "physical" topology as described above. A greater challenge is to keep this information up-to-date by periodic logical topology discovery.

Recent regulations (such as Sarbanes-Oxley) that require enterprises to impose tight controls and auditing related to business processes, make it increasingly important to track nodes and their associated activity throughout the enterprise.

Several solutions have been proposed and used for discovering nodes distributed in a computer network. The major approaches are listed below.

1. Manual discovery [1]: For node discovery, the existence of the nodes is discovered manually and the corresponding information may be recorded and updated manually to track their whereabouts. This requires, for example, individually addressing or "pinging" each IP address and port number and awaiting a response. No response indicates that a node is not present at that IP address. If there is a response, then additional investigation is required to verify the validity of the node. For topology discovery, this can involve manually signing on (with login ID and password information) to each node, review its configuration information, review the statistics records (to track actual activity between peer nodes), record this information periodically, analyze this information (for example, eliminate duplicates whereby two nodes may communicate with the same peer node) and then try to infer the topology. This method is time-consuming, resource-intensive, error-prone and can be inefficient especially for large number of nodes.

2. Agent-based discovery [1-13]: This method requires an "agent" (special piece of software) to be installed on each node. There are two major approaches involving agents:

a. Broadcast: This method usually involves the use of an agent and involves flooding the network with a special message (such as ICMP ping or SNMP GET or TCP port probing) and tries to discover the existence of nodes based on the "response" received. The broadcast method can result in unnecessary overhead due to additional network traffic since other applications (in addition to the nodes of interest) also receive this message. A more severe limitation is that the implementation of this method can appear to be a "denial of service" attack or a hacker trying all ports to see what responds for network intrusion. Hence, for security reasons, several enterprises prohibit the use of this method.

b. Heartbeat: The agent on each node periodically communicates its existence ("I am alive") to a designated application responsible for node discovery. The heartbeat method has less network traffic overhead (compared to Broadcast method), but it still requires an agent to be installed on each node. This poses additional burden to IT staff since yet an additional piece of software needs to be installed and maintained. The burden is likely to be higher if the number of nodes is larger. Also, changes (such as IP address change) in the application designated for node discovery will require re-configuration of the agents installed in all the nodes in the enterprise, which is very onerous and time-consuming.

3. Local indexed node discovery [15]: This method uses searches of limited diameter from the node originating the search along with data caching at every node to increase data replication. However, information about the network parameters of the nodes is not incorporated in the node discovery strategy.

4. Rumor mongering (gossip) [16]: This method uses a probabilistic protocol to limit the number of nodes visited during node discovery and avoid flooding of the entire network by using multicast messages. However, information about the network parameters of the nodes is not incorporated in the node discovery strategy.

5. Topology discovery using SNMP-based algorithms [13, 14]: SNMP-based algorithms are used for automatically discovering the physical network topology. Many common network management tools, such as HP's OpenView, IBM's Tivoli and Computer Associates' NetworkIT, adopt this approach. Such tools rely on information collected in SNMP (Simple Network Management Protocol) MIBs (Management Information Bases) of the individual nodes. However, the focus of these tools is the discovery of the "physical" network topology and do not support the discovery of the "logical" connection topology.

6. Miscellaneous solutions [17-19]: Miscellaneous solutions include the following:
   Link-State routing protocols primarily used by routers to exchange link-state packets by flooding throughout the network;
   Neighbor Discovery protocols supported in IPv6 that includes determining link-layer addresses of neighbors by sending a multicast message;
   Discovery of applications using RMON2 probes to probe the network traffic;
   Discovery of applications by accessing the registry on Windows and similar configuration repositories on other platforms; and
   Discovery of applications by using the collected performance data on each node to query for information.

The above and other available solutions are similar to or are a variation of the methods discussed earlier and hence are subject to similar limitations.

Figure 1:
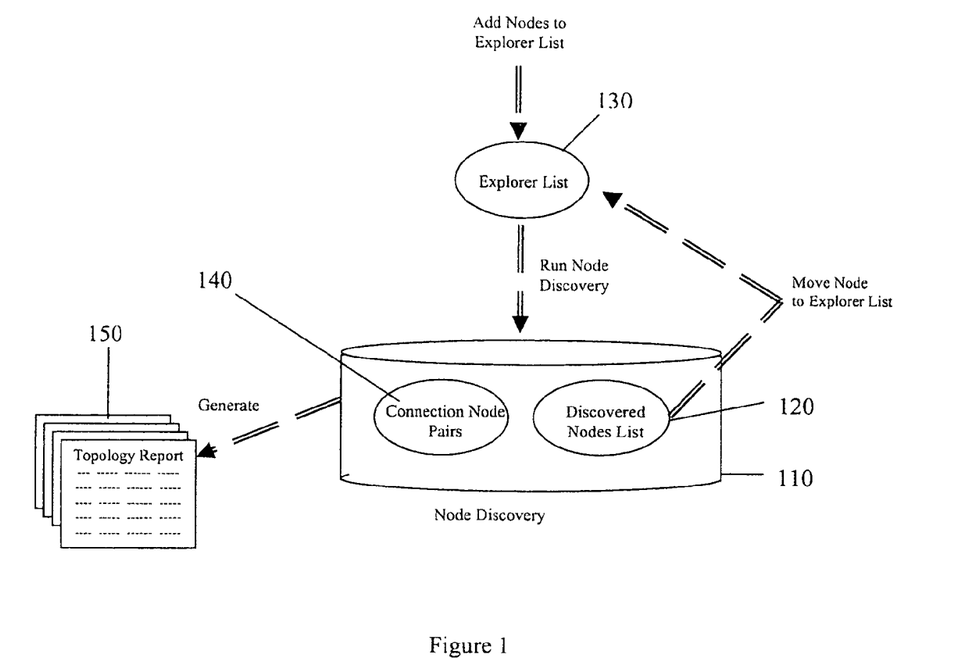
FIG. 1 is a block diagram flow chart of an overview of the present invention.

Turning now to FIG. 1, FIG. 1 is a block diagram flow chart of an overview of the present invention. The present invention involves the use of an integrated system and method to systematically and iteratively explore and discover the existence of nodes (node discovery) and the corresponding logical network topology (topology discovery) with user guidance. Nodes are discovered in computer network 110 with a Run Node Discovery process. A list 120 of Discovered Nodes is moved to Explorer List 130. The process is reiterated. Connection pair nodes 140 in network 110 are mapped to provide topology report 150.

FIG. 2 is a sample graphical user interface (GUI) of the present invention, specifically an Explorer List GUI. All the columns are configurable by the user via the Column Picker. Default column configuration is also provided. GUI elements that allow the user to guide Node exploration include:
[Node . . . ]: opens Add Sever to Explorer List Wizard.
[Remove . . . ]: removes the selected server(s) from the Explorer List. If multiple rows are selected, then the [Properties] button is disabled.
[Properties . . . ]: opens the appropriate Properties dialog for that server category (Managed, Unmanaged, Discovered).
[Enable]: specifies the selected Server(s) to be included in the next Discovery run when the [run Discovery . . . ] button is clicked by the user. It is disabled if any of the rows selected are already enabled for discovery. It adds checkmark to the first column, bolds the font of the selected row9s) and lightly shades the background.
[Disable]: disables a server that is already enabled for discovery.
[Run Discovery . . . ]: runs the Discovery process using all the checked/highlighted/bolded server rows. It toggles with [Stop Discovery . . . ].

Continuing with FIG. 2, exploration begins with the definition of at least one node to the system. The definition includes information such as IP address, port number, and security credentials (User ID and password) to access the node(s). The nodes that are defined constitute the Explorer Nodes and the corresponding list is called the Explorer List. Once node(s) are added to the Explorer List, the user can enable a subset or all of the Explorer Nodes to trigger the Node Discovery process.

FIG. 3 is a sample GUI of the present invention, specifically a Discovered List GUI. During the Node Discovery process, the system examines every enabled Explorer Node, validates its existence and collects connection configuration data (netmap information) from it. The data is analyzed to update the Network Topology as well as to identify any new discovered peer nodes. These new nodes are called Discovered Nodes and are displayed separately in the Discovered List. All the columns are configurable with the Column Picker, or a default configuration is presented. Comments are added by double-clicking and directly editing the field in the table. GUI elements for user interaction with the List include:
[Remove . . . ]: removes the selected server(s) from the Discover List. If multiple rows are selected, then the [Properties] button is disabled.
[Move to My List]: moves the selected server(s) into the My List tab. The Discovered List and the My List are separate lists in the servers do not appear in both.
[Move to Explorer List . . . ]: opens the Move to Explorer List dialog.

Figure 4:
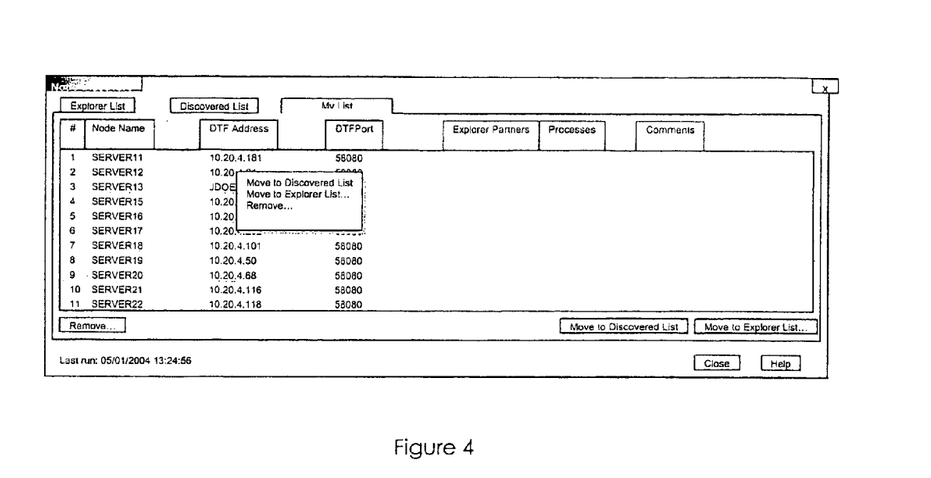
FIG. 4 is a sample GUI window tab of the present invention, specifically a My List GUI.

FIG. 4 is a sample GUI window tab of the present invention, specifically a My List GUI. The user of the system moves the Discovered Nodes to the Explorer List by providing the appropriate node definition information (such as security credentials). The user now has the option of selectively enabling or disabling the nodes in the updated Explorer List before initiating the Node Discovery process once again. All the columns are configurable with the Column Picker, or a default configuration is presented. Comments are added by double-clicking and directly editing the field in the table. GUI elements for user interaction with the List include:
[Remove . . . ]: removes the selected server(s) from My List.
[Move to Discovered List]: returns the selected server(s) into the Discovered List.
[Move to Explorer List . . . ]: opens the Move to Explorer List dialog.

Figure 5A:
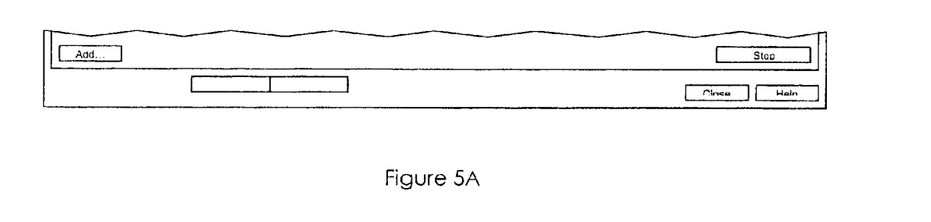
FIG. 5A is a portion of an Explorer List depicting GUI elements of the present invention during the Node Discovery process.

FIG. 5A is a portion of an Explorer List depicting GUI elements of the present invention during the Node Discovery process. The [Remove] and [Properties] buttons become disabled when an Enabled-for-Discovery row is selected (highlighted) by the user. They remain active if a non-elected row is selected. The [Enabled] and [Disable] buttons become disabled. The [Run Discovery . . . ] button toggles to [Stop Discovery . . . ]. The Progress indicator shows a counting value of the current node being processed, and a visual indicator of the percent complete of the Discovery Process.

Figure 5B:
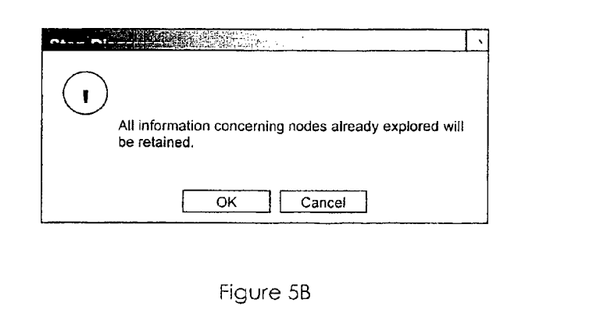
FIG. 5B is sample Stop Discovery alert of the present invention.

FIG. 5B is sample Stop Discovery alert of the present invention. The alert is displayed when the [Stop Discovery . . . ] button of FIG. 5A is selected by the user.

Figure 6:
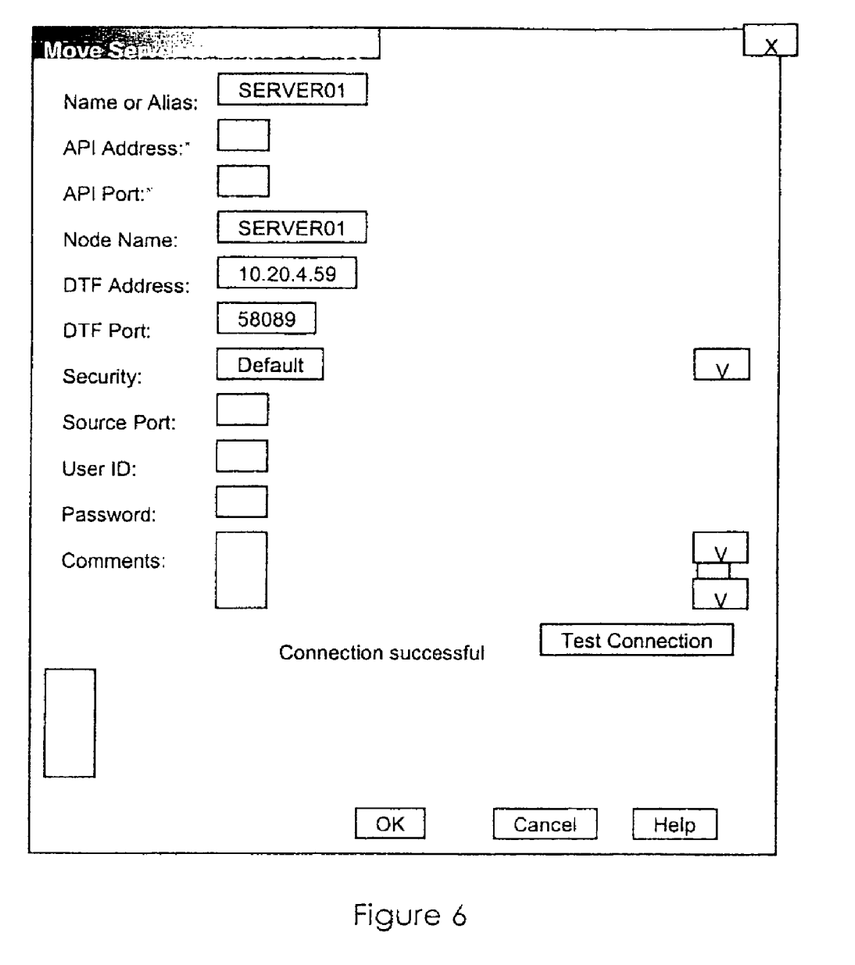
FIG. 6 is a sample Move to Explorer List GUI window of the present invention.

FIG. 6 is a sample Move to Explorer List GUI window of the present invention. GUI buttons facilitate user guidance of server addition to the Explorer List, and status is indicated. An Error dialog pops up in the event of a duplicate server in the Explorer List.

Figure 7:
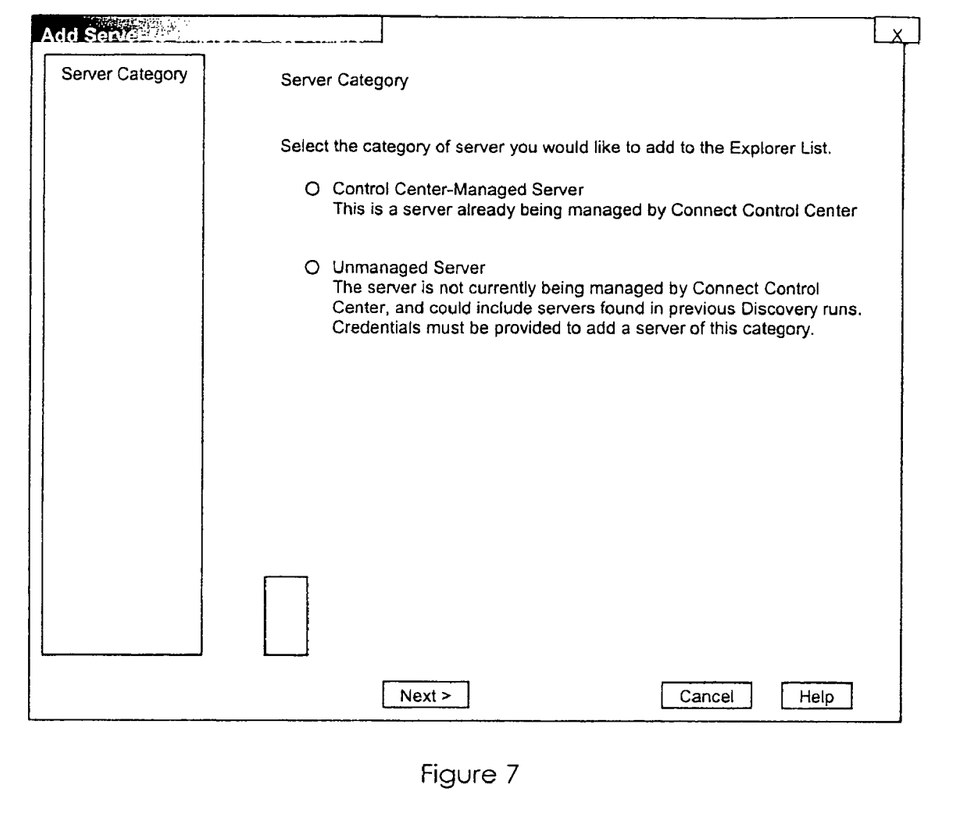
FIG. 7 is a sample Add Server GUI window of the present invention providing user guidance elements for indicating Server Category.

FIG. 7 is a sample Add Server GUI window of the present invention providing user guidance elements for indicating Server Category. The Add Server window of a specific embodiment of the invention adds the identified server to an Explorer List Wizard of the present invention.

Figure 8:
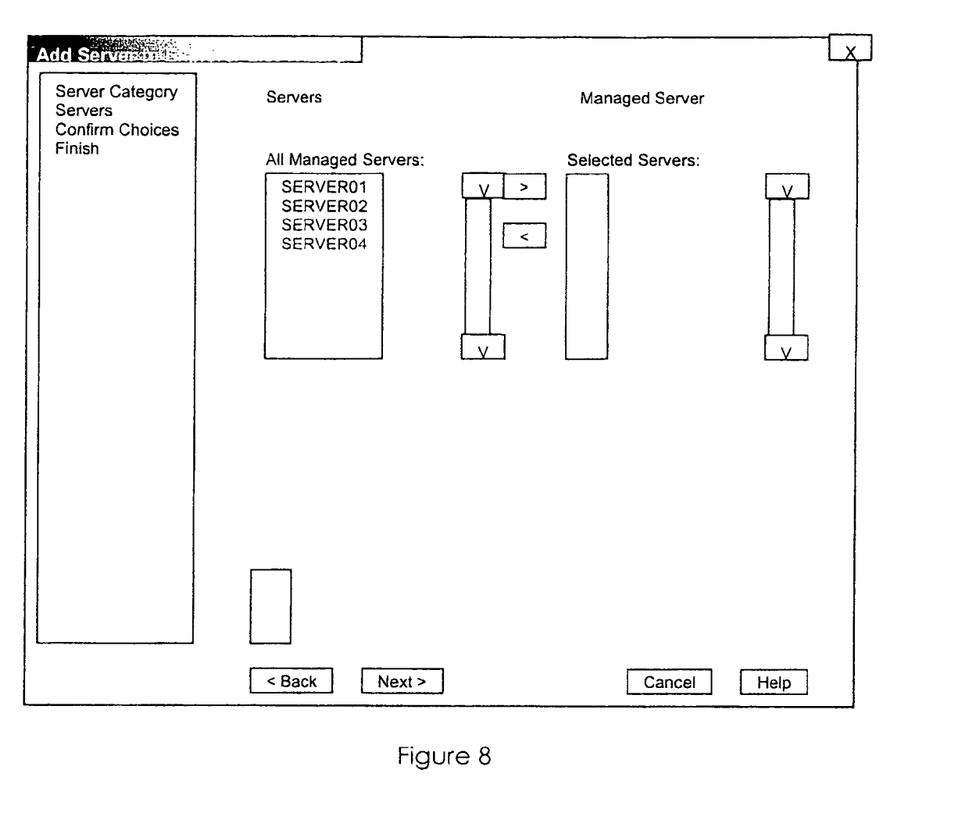
FIG. 8 is a sample Add Server GUI window of the present invention providing the Managed function.

FIG. 8 is a sample Add Server GUI window of the present invention providing the Managed function. User guidance elements allow a user select one or more managed servers to an Explorer List Wizard of the present invention.

Figure 9:
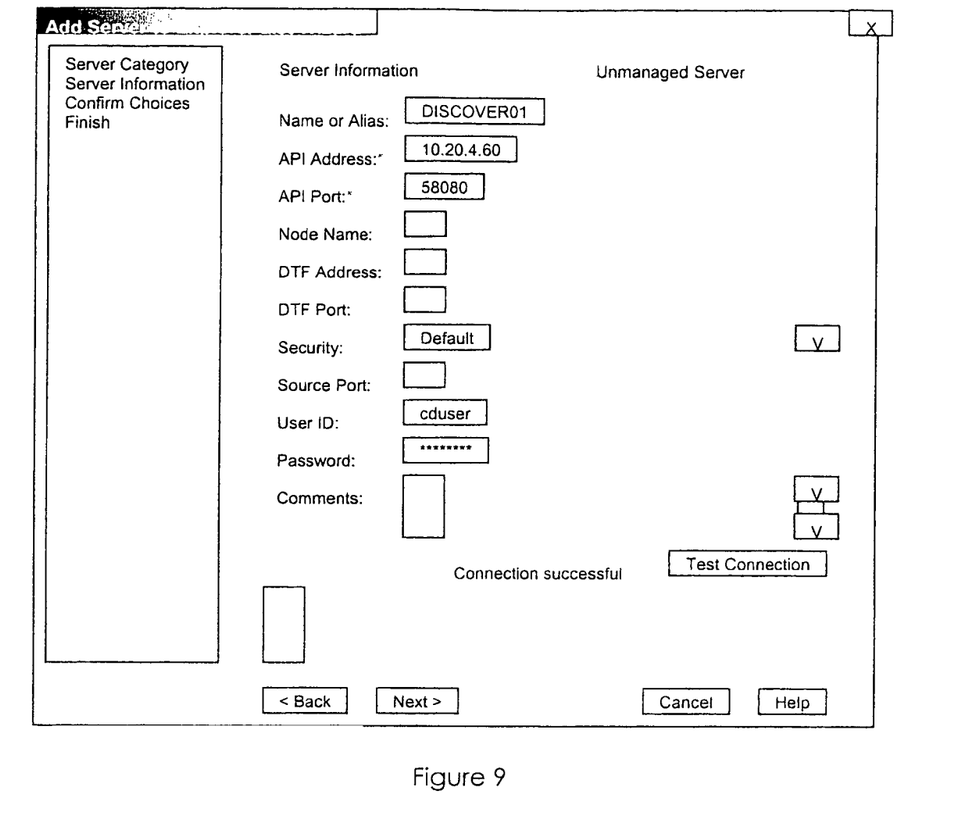
FIG. 9 is a sample Add Server GUI window of the present invention providing the Unmanaged function.

FIG. 9 is a sample Add Server GUI window of the present invention providing the Unmanaged function. Server information is displayed and user guidance elements facilitate the determination by the user whether to add the unmanaged server to an Explorer List Wizard of the present invention.

Figure 10:
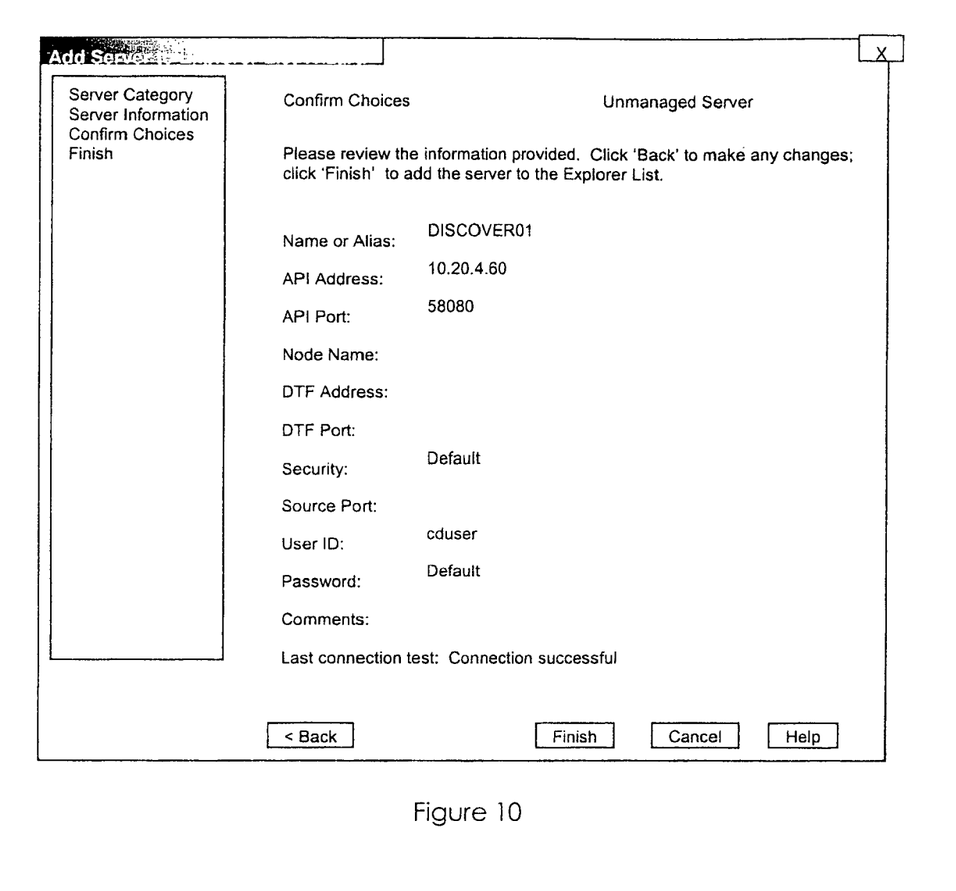
FIG. 10 is a sample Add Server GUI window of the present invention providing the Confirmed (unmanaged server) function.

FIG. 10 is a sample Add Server GUI window of the present invention providing the Confirmed (unmanaged server) function. The window provides instructions and GUI elements for the user to add the server to the Explorer List Wizard of the present invention.

Figure 11:
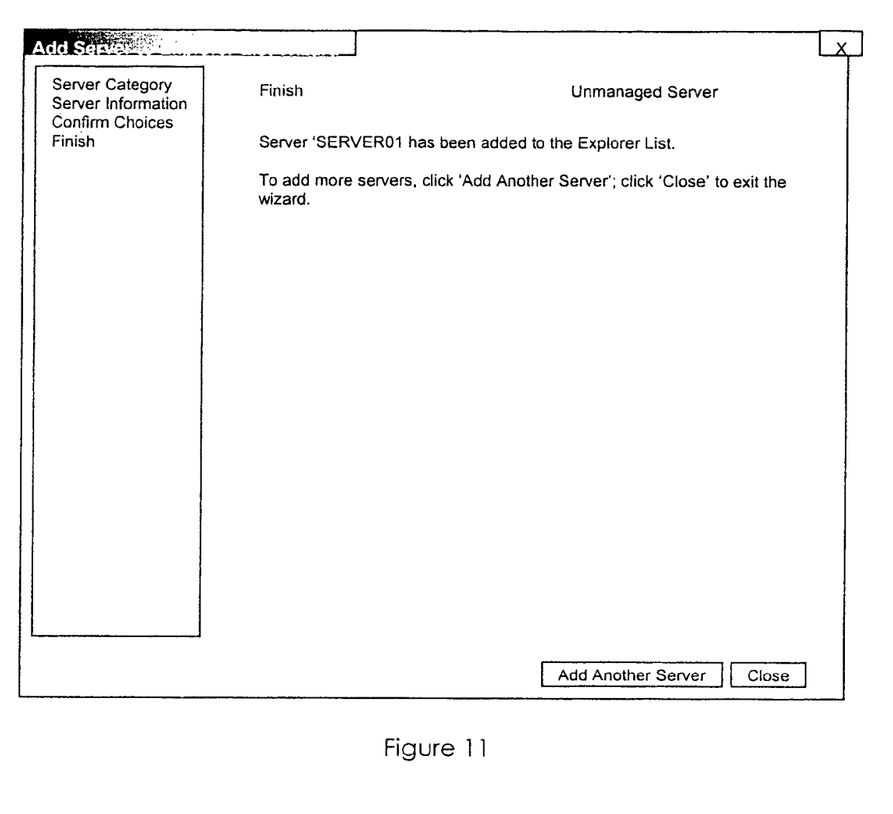
FIG. 11 is a sample Add Server GUI window of the present invention providing the Finish function.

FIG. 11 is a sample Add Server GUI window of the present invention providing the Finish function. The Finish window provides a status report (successful addition of the server to the Explorer List Wizard), together with instructions and GUI elements to add another server.

Figure 12:
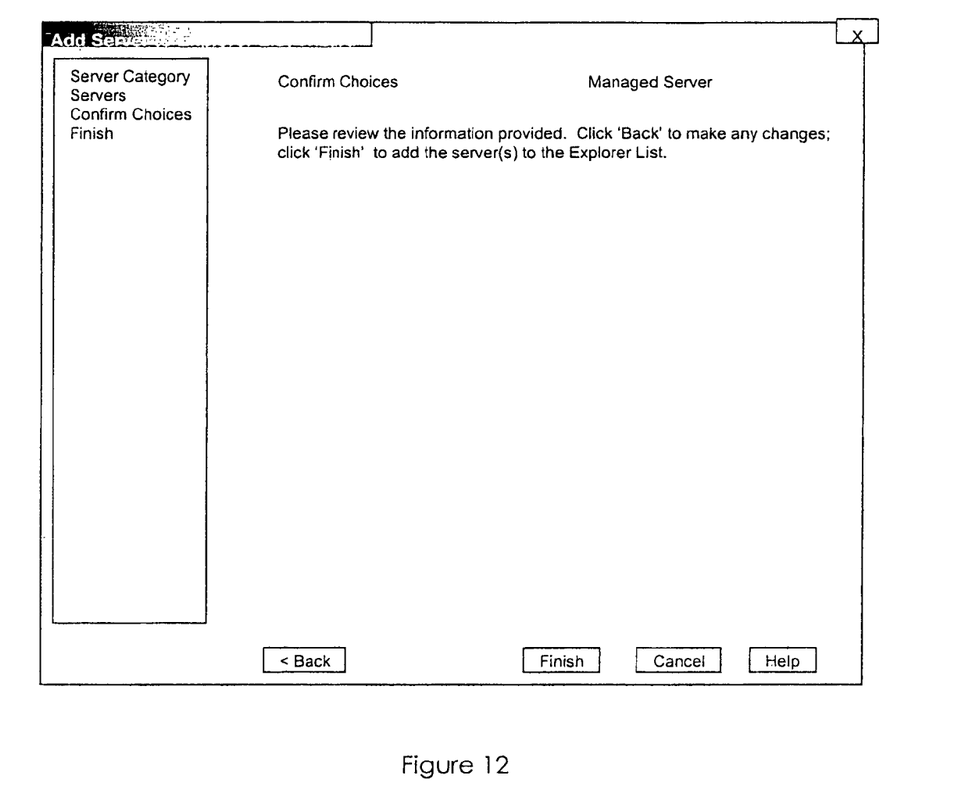
FIG. 12 is a sample Add Server GUI of the present invention providing the Confirm (managed servers) function.

FIG. 12 is a sample Add Server GUI of the present invention providing the Confirm (managed servers) function. Managed servers selected from the window of FIG. 8 are confirmed added to the Explorer List Wizard. GUI elements permit correction of the information by the user.

Figure 13:
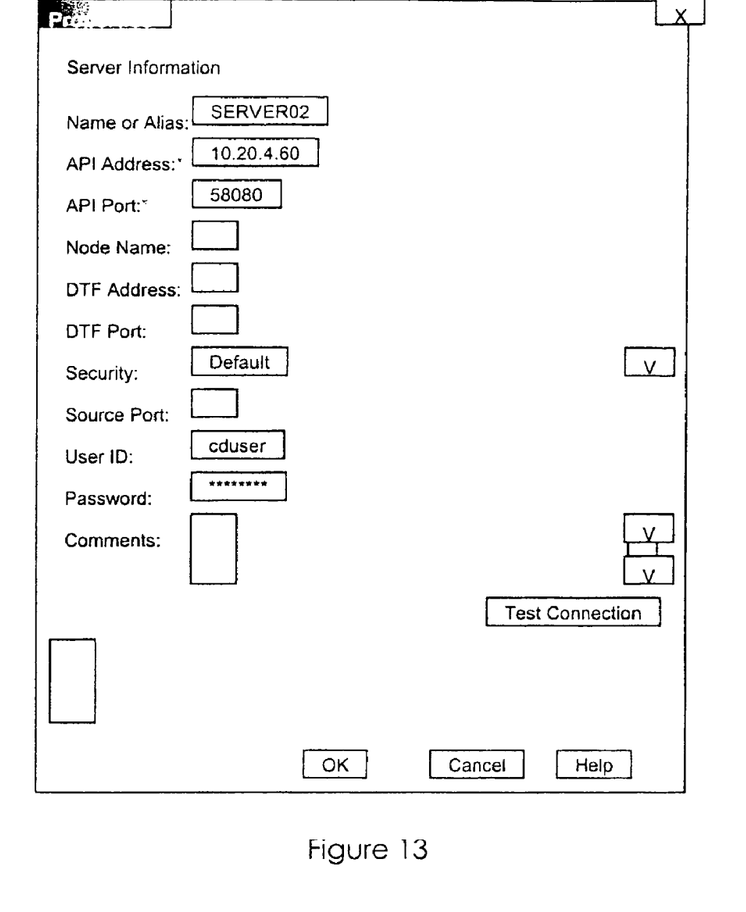
FIG. 13 is a sample Properties GUI of the present invention.

FIG. 13 is a sample Properties GUI of the present invention. The GUI window of FIG. 13 displays property information of a user selected server and provides GUI elements for user interaction with the window.

Figure 14:
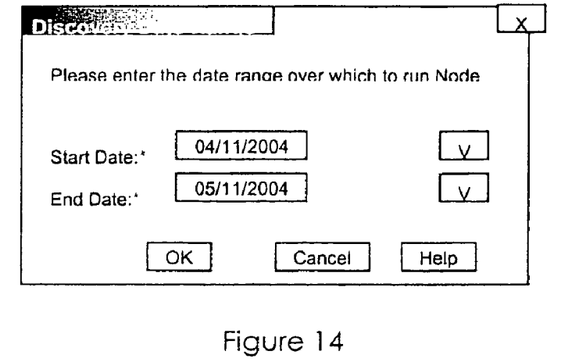
FIG. 14 is a sample Discovery Date Range dialog box of the present invention.

FIG. 14 is a sample Discovery Date Range dialog box of the present invention. The dialog box is opened when the [Run Discovery . . . ] button is clicked by the user. Pull down Arrows open a calendar control that allows the user to select a date. The End Date defaults to the current date, but user modifiable.

Figure 15:
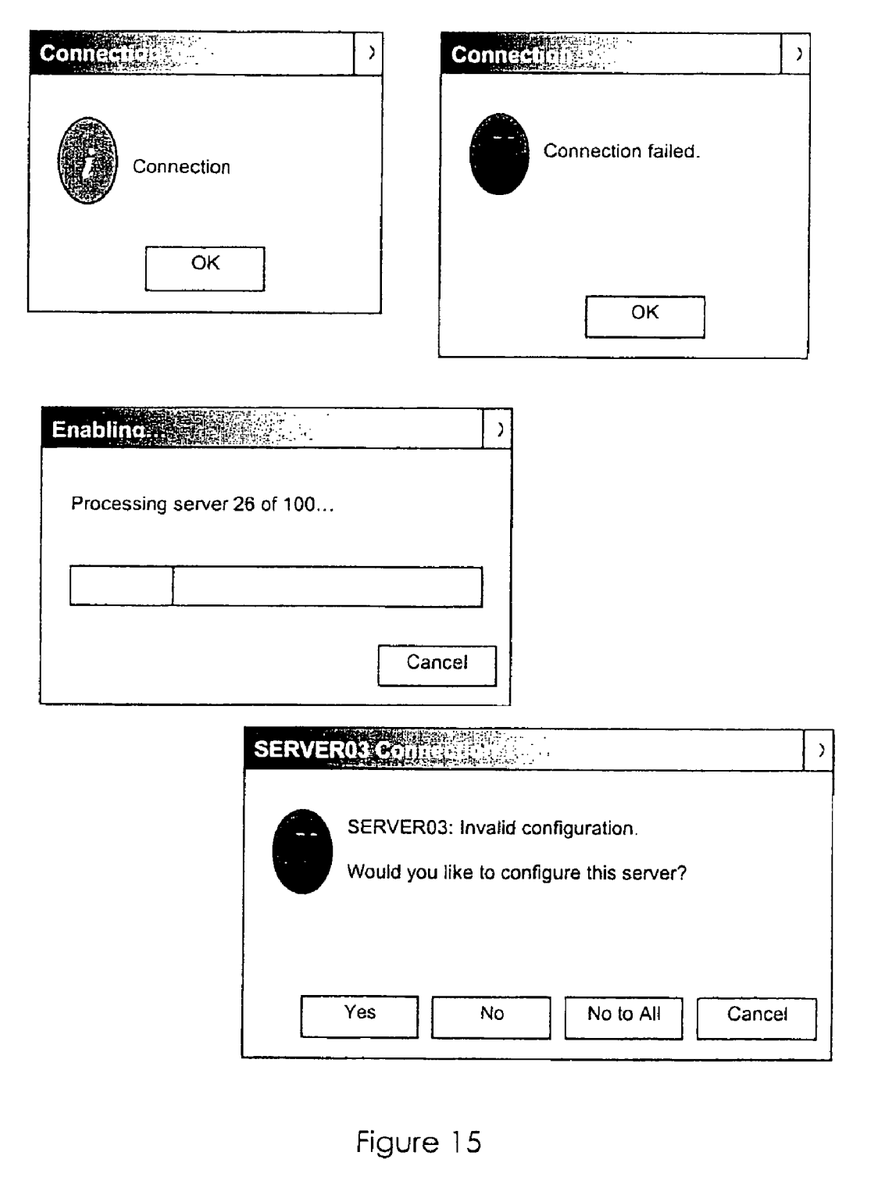
FIG. 15 is a selection of sample alert windows of the present invention.

FIG. 15 is a selection of sample alert windows of the present invention. For example, the "Connection Test" alerts appear in response to a user clicking the [Test Connection] button from the Add Server Wizard or "Properties" dialog of the present invention. The "Enabling" window is displayed when a user elects to enable one or more servers from the Explorer List (multi-select is permitted for enabling servers for discovery). The window indicates the status or progress of server enabling. If a duplicate server is found in the Discovered List, de-duping is automatically performed by merging information and removing the server from the Discovered List and retaining it as an enabled server in the Explorer List.

Using the above system, the Node Discovery process is performed in an iterative manner at any time by the user. During each iteration, the user has the flexibility to enable or disable Explorer Nodes for Node Discovery, move specific Discovered Nodes to the Explorer List and initiate Node Discovery. Each iteration may be referred to as a Level, and, since the process of discovery of nodes and corresponding topology may entail one or more iterations, the present invention is characterized as Multi-Level. Since the discovery process involves occasional user guidance via an user interface, the present invention is characterized as Guided.

The present invention, in various embodiments, supports computer platforms including Windows, Unix, Sun Solaris, HP-UX, IBM AIX, Linux, HP NonStop, OS/390, and OS/400.

The invention enables the user to:

(1) Discover the peer nodes deployed within the enterprise.

(2) Discover any peer nodes outside the enterprise with which the nodes within the enterprise have been configured to communicate.

(3) Discover the logical network topology of peer nodes by examining their connection configuration (independent of the underlying physical network topology).

(4) Generate reports to help analyze the connection configuration information collected as part of Node Discovery process.

(5) Ensure that the connection configuration information of peer nodes is accurate and up-to-date.

The invention defines a node as a software application that facilitates the secure, reliable and automated transfer of mission-critical data. Almost all other current solutions define a node as a system (such as computer hardware resources) or a network device (such as routers and switches), or focus on general-purpose software applications such as databases, web servers, and application servers.

The invention is particularly apt for nodes that are "peers," which may be deployed on heterogeneous platforms but have substantially equivalent capabilities. Most of the other solutions do not support this ability. Peer nodes are, optionally, manually configured to communicate with a specific set of peer nodes, for specific file transfers, in the same or different network domains, within as well as between enterprises. This is unlike traditional peer-to-peer networks (such as Gnutella™) where each node automatically contacts its peer nodes when a user requests a file.

File transfer processes between peer nodes are specified and controlled by the user, including parameters such as communication protocols, parties involved in communication, and schedule. This is unlike traditional peer-to-peer networks where, once a user requests a file, there is little user control in terms of communication with peer nodes.

The present invention does not require the installation or the use of any agent on each node, does not use broadcast or SNMP-based solution. Instead it uses direct queries using the user interface to discover the nodes. It is fast, scalable and poses few security risks.

Node-specific information such as its API Address, API Port, Node Name, operating system, and license key, as well as connection configuration information such as the identity of the peer nodes to which it can communicate, generally referred to as static information is collected at each node.

The invention also collects dynamic information, and correlates multiple sources of connectivity information, such as node-specific information as listed above, connection configuration information and information about actual file transfer activity at each node. Connection configuration information may be different across nodes, especially those on different operating systems/platforms. The invention intelligently reconciles any platform-specific differences and presents the information to the user in a unified and coherent manner.

The user specifies a specific period for filtering the information collected about actual file transfer activity between peer nodes. This provides the user with the flexibility to optionally ignore information that is obsolete or no longer of interest to the user.

Intelligent, efficient, analysis and representation of the relationships between peer nodes (including direction of file transfer as a sender or receiver) is a further advantage of the present invention. This is accomplished by collecting connection configuration information at each node as well as the information about the actual file transfer activity between the nodes. Any inconsistencies in different sources of information collected by the system are highlighted to the user with relevant details to enable the user to make informed decisions and resolve the inconsistencies.

Various embodiments of the invention enable the discovery of nodes at the periphery of the enterprise, including peer nodes in the De-Militarized Zone (DMZ) as well as peer nodes just within the security perimeter/firewall of the enterprise. Discovery of nodes just outside the enterprise (which communicate with nodes just within the security perimeter/firewall of the enterprise) is useful, for example, for tracking business-to-business (B2B) transactions between an enterprise and its trading partners.

Accordingly, the invention provides flexibility for a user to define Explorer Nodes and selectively enable and disable Explorer Nodes for Node Discovery. Also, any problems (such as incorrect IP address or security credentials) in the definition of the Explorer Nodes are visually highlighted in the Explorer List.

The length of time for the Node Discovery process depends on the number of Explorer Nodes enabled for discovery as well as the level of traffic in the network. During Node Discovery process, the system graphically depicts the status and progress (such as percent completed) of node discovery. This provides a visual clue to the user in terms of the expected time of completion of Node Discovery.

During the Node Discovery processes, if the enabled Explorer Node cannot be contacted, the user is provided several flexible options including the ability to update the definition of the Explorer Node, to skip this node and continue with Node Discovery process for other enabled Explorer Nodes, and to end the Node Discovery process.

Additionally, during the Node Discovery process, if more than one Explorer Node communicates with the same peer node that is discovered, then the invention intelligently recognizes the fact and avoids the duplicate listing of the peer node in the Discovered List.

Various system embodiments of the invention include a browser for the user to centrally and remotely manage (create, add, update or delete) connection configuration information at a desired node, which is useful, for example, to investigate and correct any discrepancies or inconsistencies found by the system as part of node discovery. The browser integrated with certain embodiments also enables the user to copy specific connection configuration information (netmap entries) from one node to another.

The user defines the node for Node Discovery and provides appropriate security credentials. With the auto-login feature of certain embodiments of the invention, however, the user does not need to provide the security credentials for subsequent access to the configuration information at that node.

The My List feature of the invention enables the user to temporarily copy or move desired nodes from the Discovered List. This is used, for example, as a temporary work area for further investigation such as verifying the existence of the node or investigating the reasons for discrepancies in associated information.

The Discovered List or My List is used, for example, to identify the following information about Discovered Nodes: information about how the node was discovered (i.e., find the Explorer Nodes from which this node was discovered), node information (such as DTF Address, DTF Port), list of peer nodes, and information about actual file transfer activity on that node.

The invention offers on-demand reports. A few example reports are:

(1) Network Topology Summary Report provides a summary of the information of all Explorer and Discovered Nodes.

(2) Network Topology Detailed Report lists the details of all the Discovered Nodes corresponding to a specific Explorer Node.

(3) Potentially Missing Netmaps Entry Report helps the user to manage the netmap entries (connection configuration information) for the appropriate nodes. Note that it is possible for a node A to have a netmap entry denoting that it can communicate with node B; however, it does not necessarily imply that node B has a netmap entry denoting that it can communicate with node A. One of the possible reasons for missing netmap entry is that the user might have inadvertently missed updating the netmap information at node B.

(4) Potentially Invalid Netmap Entry Report helps the user to manage inconsistencies in connection configuration information. One of the possible reasons for invalid netmap entry is that the peer node listed in this netmap entry may no longer exist or it may have been moved.

(5) Potentially Inactive Netmaps Entry Report helps the user identify the unused netmap entries in a node. In this case, the netmap entries are valid: however, no actual file transfer between the nodes listed in the netmap entries has occurred for a user-specified period. The report denotes that the relevant netmap entries may have become obsolete.

Conventional solutions are primarily oriented towards network or systems users. In contrast, the invention is oriented towards users responsible for the secure and reliable transfer of mission-critical data. The invention, therefore, is a boon for enterprises that rely on such special-purpose software applications for their growth and survival in the marketplace.

The present invention is fast, scalable, poses few security risks, and overcomes conventional limitations. The invention imposes relatively little overhead in terms of additional network traffic for node and topology discovery.

The invention provides flexibility in discovering nodes, reconciling discrepancies (such as inactive, invalid or missing netmap entries) and in improving the utilization of the nodes and tracking the associated activity.

The user is relieved from the overhead of installing agents in each node, from the agony of manually having to access each node repeatedly to check or to update its connection configuration information, or to expend enormous time and resources to infer the logical connection topology among the peer nodes.

Embodiments of the invention closely mimic users in terms of how they think and operate with respect to node and topology discovery and troubleshooting. They also closely align with the operational requirements and policies (such as security controls) at most enterprises. For example, the connection configuration information (netmap entries) at a specific node can be used to discover the existence of the peer nodes to which it can communicate. While this does not necessarily guarantee the existence of the peer node, it is the first step of the discovery process. The next step is to attempt to contact the discovered node directly to verify its existence For enterprise security reasons, however, access to the discovered node is optionally authorized by the user.

The non-existence of a netmap entry, however, does not necessarily preclude any communication between the peer nodes. This is because the user (or whoever was responsible before the user assumed his/her current role) may have used command-line parameters to specify the connection configuration. So, the invention checks the actual file transfer activity information to verify if there was any actual communication. The intuitive approach to node and topology discovery is an advantage of the present invention and is likely to significantly improve the productivity of the user.

At each node, the connection configuration information is user-specified and changes less frequently compared to the information about actual file transfer activity. The former information is more likely to become stale, obsolete or invalid due to human error and other reasons. In contrast, the latter information reflects reality and actual usage and is bound to be accurate.

The invention intelligently combines the static and the dynamic information, the user-specified configuration information and the actual file transfer activity information, in systematically "stitching" the local node-specific configuration information to create a global logical topology. The user can discover the nodes and the corresponding logical topology in an efficient, intuitive and an elegant manner.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

REFERENCES

1. U.S. Pat. No. 6,052,727: "Method of Discovering Client Systems on a Local Area Network", Apr. 18, 2000
2. P. Dasgupta, "Incentive Driven Node Discovery in a P2P Network Using Mobile Intelligent Agents", ICAI 2003, URL: www.ist.unomaha.edu/faculty/dasgupta/research/papers/icai03/icai03.pdf
3. Gnutella, URL: www.gnutella.com
4. eEMU: A Practical Tool and Language for System Monitoring and Event Management, USENIX Proceedings, 2000, pp. 131-137 URL: http://www.usenix.org/publications/library/proceedings/lisa2000/full_papers/voleynik/voleynik_html/
5. IBM Tivoli NetView for Windows User's Guide, Version 7 Release 1.4, August 2003, "Automatic Network Discovery" section URL: http://publib.boulder.ibm.com/tividd/td/netview/SC32-1245-00/en_US/HTML/dwm12mst166.htm
6. CISCO Media Gateway Manager User Guide, Release 3.0 "Configuration" section. URL: http://www.cisco.com/univercd/cc/td/doc/product/rtrmgmt/cmgm/user_3_0/manage.htm#1032934
7. LANdecoder SNMP Manager—Product Overview, URL: http://www.triticom.com/triticom/SNMPManager/
8. Cool Tools: Network View—a network node discovery tool, August 2003; URL: http://www.aplawrence.com/cgi-bin/printer.pl?/Reviews/dhnetworkview.html
9. NetPlus AutoManage—Network Discovery, URL: http://www.isp-planet.com/equipment/automanage2.html
10. Opticom iView Adds Application Discovery and Dependency Mapping, Jul. 28, 2004. URL: http://www.enterpriseappspipeline.com/howto/26100358
11. Entuity Eye of the Storm—IT Infrastructure Discovery URL: http://www.entuity.com/products/discovery.htm
12. CA-Unicenter: The Next Generation, Network Computing, Mar. 25, 1997, http://www.networkcomputing.com/806/806sp1.html
13. NetworkIT 2.0—Product Information, Computer Associates (see section under "EnterpriseDiscovery")
    URL: http://ca.com/products/descriptions/networkit_ee.pdf
    URL: http://ca.com/products/faq/networkitpro_faq_ee.htm
14. Y. Breitbart et. al., "Topology Discovery in Heterogeneous IP Networks,", Bell Labs, INFOCOM 2000 URL: http://www.bell-labs.com/user/minos/Papers/infocom00-cam.pdf
15. B. Yang and H. Garcia-Molina, "Improving search in peer-to-peer networks," Proceedings of the 22nd International Conference on Distributed Computing Systems (ICDCS'02), Vienna, Austria, July 2002, pp. 5-14.
16. M. Portmann and A. Seneviratne, "Cost-effective broadcast for fully decentralized peer-to-peer networks," Computer Communication, vol. 26, no. 11, Jul. 1, 2003, pp. 1159-1169.
17. S. N. Syed and Y. Ding, "Performance Knowledge Discovery for Modeling," BMC Software, Inc., 2001, URL: http://www.bmc.com/offers/performance/whitepapers/docs/2001/performance_knowledge_discovery_for_modeling.pdf
18. C. Metz, "At the Core of IP Networks: Link-State Routing Protocols," IEEE Internet Computing, September-October. 1999, pp. 72-77.
19. T. Narten, "Neighbor Discovery and Stateless Autoconfiguration in IPv6", IEEE Internet Computing, July-August 1999, pp. 54-62.

We claim:

1. A method comprising:
    selectively enabling, via instructions executed by a computer, a discovery process with respect to a first node selected by a user from a list of identified nodes;
    receiving a selection of a specific time period from the user at the computer;
    receiving a first user selection at the computer to initiate the discovery process, the discovery process implemented via instructions executed by the computer and comprising:
        determining connection configuration data for the first node and information about file transfer activity at the first node during the specific time period;
        analyzing the connection configuration data from the first node to update a network topology and to identify a second node not in the list of identified nodes; and
        placing information about the second node in a discovered nodes list that is separate from the list of identified nodes and accessible to the user, wherein duplicate listings of the information about the second node in the discovered nodes list are inhibited when more than one node from the list of identified nodes identifies the second node;
    receiving a second user selection at the computer to move the second node from the discovered nodes list to the list of identified nodes;
    receiving a third user selection at the computer to enable the discovery process with respect to the second node;
    receiving another user selection at the computer to initiate the discovery process for the second node; and
    providing, via instructions executed by the computer, a topology report.

2. The method of claim 1, further comprising validating the existence of the first node during the discovery process.

3. The method of claim 1, further comprising:
    selectively enabling at least one other node from the list of identified nodes when selectively enabling the first node.

4. The method of claim 1, further comprising:
    receiving a request for a report of nodes that have valid internet protocol addresses and valid port numbers where no file transfer to and from the nodes that have valid internet protocol addresses and valid port numbers occurred for a user-specified period; and generating the report.

5. The method of claim 1, wherein the connection configuration data for the first node includes at least one of an IP address, a port number, a security credential, a communication protocol, an operating system, a license key, and an identity of a particular node that the first node can communicate with.

6. The method of claim 1, further comprising removing a node from the discovered nodes list when the node is selectively enabled for the discovery process.

7. The method of claim 1, wherein the connection configuration data for the first node includes node specific information of the first node.

8. The method of claim 1, further comprising collecting network map information from the first node.

9. The method of claim 8, further comprising determining a logical network topology based on the network map information.

* * * * *